United States Patent
Sajdak et al.

(10) Patent No.: US 10,866,196 B1
(45) Date of Patent: Dec. 15, 2020

(54) SYSTEMS AND METHODS FOR USE IN PERFORMING MAINTENANCE ON A TURBINE ROTOR

(71) Applicant: General Electric Company, Schenectady, NY (US)

(72) Inventors: Lukasz Sajdak, Rusiec (PL); Dariusz Zybura, Warsaw (PL); Anna Ewa Swieca, Blonie (PL); Kamil Koszarny, Warsaw (PL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/792,494

(22) Filed: Feb. 17, 2020

(51) Int. Cl.
| | |
|---|---|
| *G01N 21/95* | (2006.01) |
| *F01D 5/00* | (2006.01) |
| *G01B 11/00* | (2006.01) |
| *B25J 15/00* | (2006.01) |
| *B25J 9/00* | (2006.01) |
| *B25J 9/16* | (2006.01) |

(52) U.S. Cl.
CPC ............ *G01N 21/95* (2013.01); *B25J 9/0096* (2013.01); *B25J 9/1692* (2013.01); *B25J 9/1697* (2013.01); *B25J 15/0019* (2013.01); *F01D 5/005* (2013.01); *G01B 11/005* (2013.01); *F05D 2230/72* (2013.01); *F05D 2230/80* (2013.01); *G01N 2201/02* (2013.01)

(58) Field of Classification Search
CPC ..... G01N 21/95; G01B 11/005; B25J 9/1692; B25J 15/0019; F01D 5/00
USPC ......................................................... 356/614
See application file for complete search history.

(56) References Cited

U.S. PATENT DOCUMENTS

| | | | |
|---|---|---|---|
| 2012/0096946 A1* | 4/2012 | Schleif ...................... | F02C 9/28 |
| | | | 73/756 |
| 2016/0349731 A1 | 12/2016 | Blais et al. | |
| 2019/0308319 A1* | 10/2019 | Walters ................. | F04D 29/644 |

FOREIGN PATENT DOCUMENTS

WO 99/41600 A1 8/1999

\* cited by examiner

*Primary Examiner* — Hung Nguyen
(74) *Attorney, Agent, or Firm* — Armstrong Teasdale LLP

(57) ABSTRACT

A system for use in performing maintenance on a turbine rotor. The system includes a rotor mount configured to receive the turbine rotor, a robotic device, a visual inspection device removably coupleable to the robotic device, and a computing device. The computing device is configured to direct the robotic device to evaluate, with the visual inspection device, the turbine rotor at different circumferential locations thereof to obtain rotor axis data, determine a centerline of the turbine rotor based on the rotor axis data, generate a coordinate system including the centerline of the turbine rotor, direct the robotic device to evaluate, with the visual inspection device, each blade on at least one stage of the turbine rotor to obtain blade position data relative to the centerline, and populate the coordinate system with the blade position data.

20 Claims, 4 Drawing Sheets

SYSTEMS AND METHODS FOR USE IN PERFORMING MAINTENANCE ON A TURBINE ROTOR

BACKGROUND

The present disclosure relates generally to turbine rotor maintenance operations and, more specifically, to systems and methods of calibrating a robotic device for use in performing maintenance on a turbine rotor.

Many types of industrial machines, such as gas turbines, include components which are encased within an external casing or shell. During the life cycle of a gas turbine, such components require periodic maintenance, such as inspection and repair, to enhance the lifespan of the components and/or the gas turbine as a whole. At least some known maintenance operations are performed while the gas turbine is out of service by removing the casing and disassembling the gas turbine as-needed to provide access to a rotor assembly of the gas turbine. However, such maintenance may be technically difficult, time-consuming, labor-intensive, and costly to perform. Once disassembled, visual inspection of the rotor assembly is typically performed manually by a technician to identify components or portions of components that may be in need of maintenance. Manual visual inspection of the rotor assembly is also a time-consuming and labor-intensive task. The aforementioned maintenance operations incur costs both in labor and in non-productive down time for the gas turbine.

BRIEF DESCRIPTION

In one aspect, a system for use in performing maintenance on a turbine rotor is provided. The system includes a rotor mount configured to receive the turbine rotor, a robotic device, a visual inspection device removably coupleable to the robotic device, and a computing device. The computing device is configured to direct the robotic device to evaluate, with the visual inspection device, the turbine rotor at different circumferential locations thereof to obtain rotor axis data, determine a centerline of the turbine rotor based on the rotor axis data, generate a coordinate system including the centerline of the turbine rotor, direct the robotic device to evaluate, with the visual inspection device, a plurality of blades on at least one stage of the turbine rotor to obtain blade position data relative to the centerline, and populate the coordinate system with the blade position data.

In another aspect, a method of calibrating a robotic device for use in performing maintenance on a turbine rotor is provided. The method includes evaluating, using a visual inspection device, the turbine rotor at different circumferential locations thereof to obtain rotor axis data, determining a centerline of the turbine rotor based on the rotor axis data, generating a coordinate system including the centerline of the turbine rotor, evaluating, using the visual inspection device, a plurality of blades on at least one stage of the turbine rotor to obtain blade position data relative to the centerline, and populating the coordinate system with the blade position data.

In yet another aspect, a method of calibrating a robotic device for use in performing maintenance on a turbine rotor is provided. The method includes evaluating, using a visual inspection device on the robotic device, the turbine rotor at different circumferential locations thereof to obtain rotor axis data, determining a centerline of the turbine rotor based on the rotor axis data, evaluating, using the visual inspection device, a plurality of blades on at least one stage of the turbine rotor to obtain blade position data relative to the centerline, and performing, using the visual inspection device, a visual inspection of blades of the turbine rotor as the blade position data is obtained.

DETAILED DESCRIPTION

The embodiments described herein relate to systems and methods of performing maintenance on a turbine rotor. In the exemplary embodiment, a robotic device is used to perform maintenance on a rotor. Calibration of the robotic device facilitates precisely determining the position of rotor blades on the turbine rotor to enable automated maintenance operations to be initiated after the calibration is performed. In the exemplary embodiment, the robotic device is a multi-axis robot, such as a 7-axis robot, having an end effector attached thereto. To calibrate the robotic device, a visual inspection device end effector is attached to the robotic device for use in evaluating the turbine rotor and in generating a three-dimensional coordinate system. The coordinate system is defined by a rotor axis centerline and a plurality of blade coordinate points populated about the centerline, both determined based on the evaluation. In some embodiments, the visual inspection device also evaluates the turbine rotor for potential defects as rotor axis and blade position data is obtained. The generated coordinate system may be used to control motion of the robotic device relative to the turbine rotor in the performance of post-calibration maintenance operations. For example, after the coordinate system is generated, the visual inspection device may be removed from the robotic device to enable a different end effector to be attached to the robotic device for use in performing the maintenance operations. Accordingly, the systems and methods described herein facilitate evaluating a turbine rotor in a fast and efficient manner, thereby enabling automated maintenance operations to be performed and in a manner that facilitates reducing down time of an associated gas turbine assembly.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
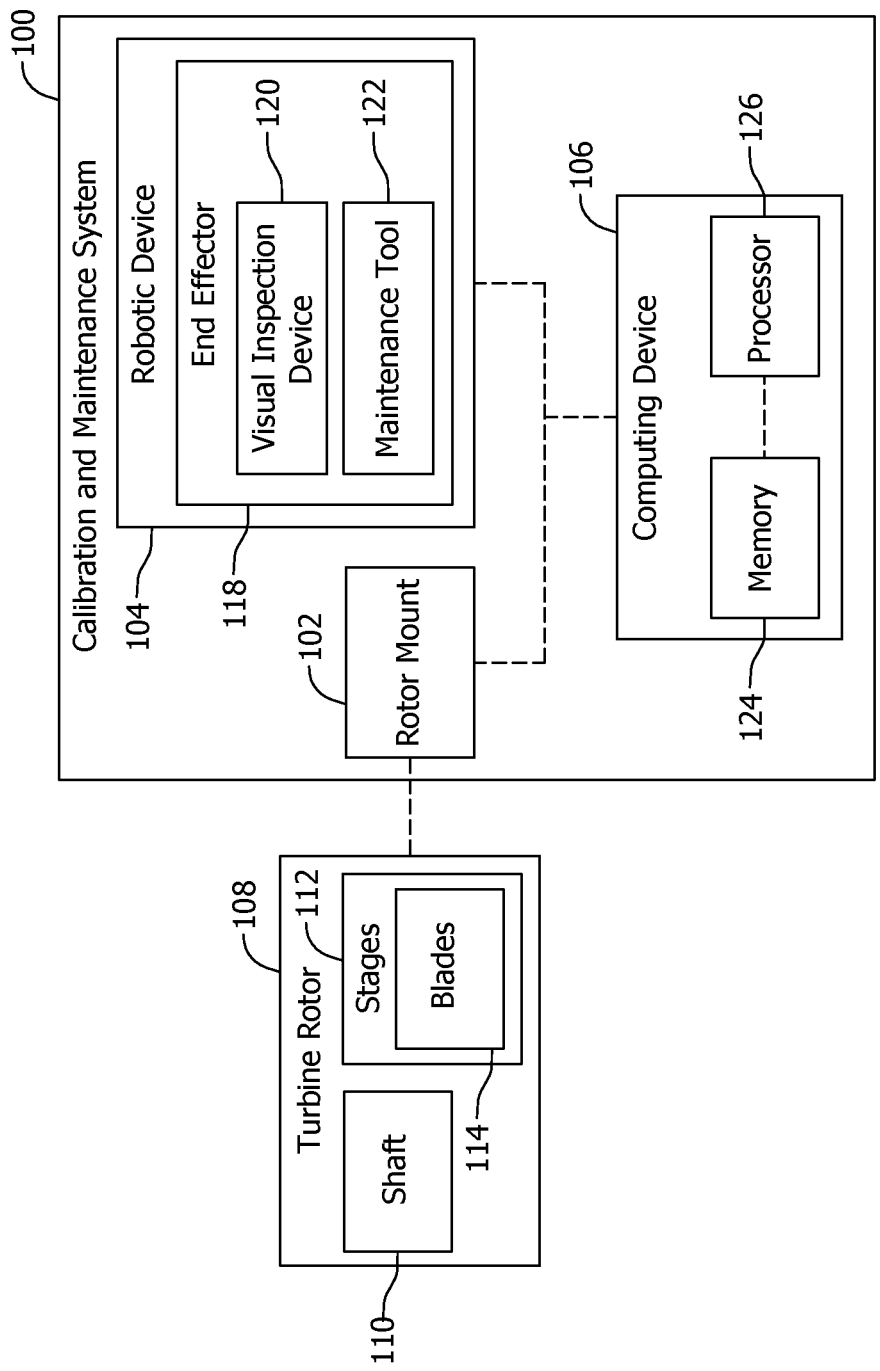
FIG. 1 is a block diagram illustrating an exemplary calibration and maintenance system.
Figure 2:
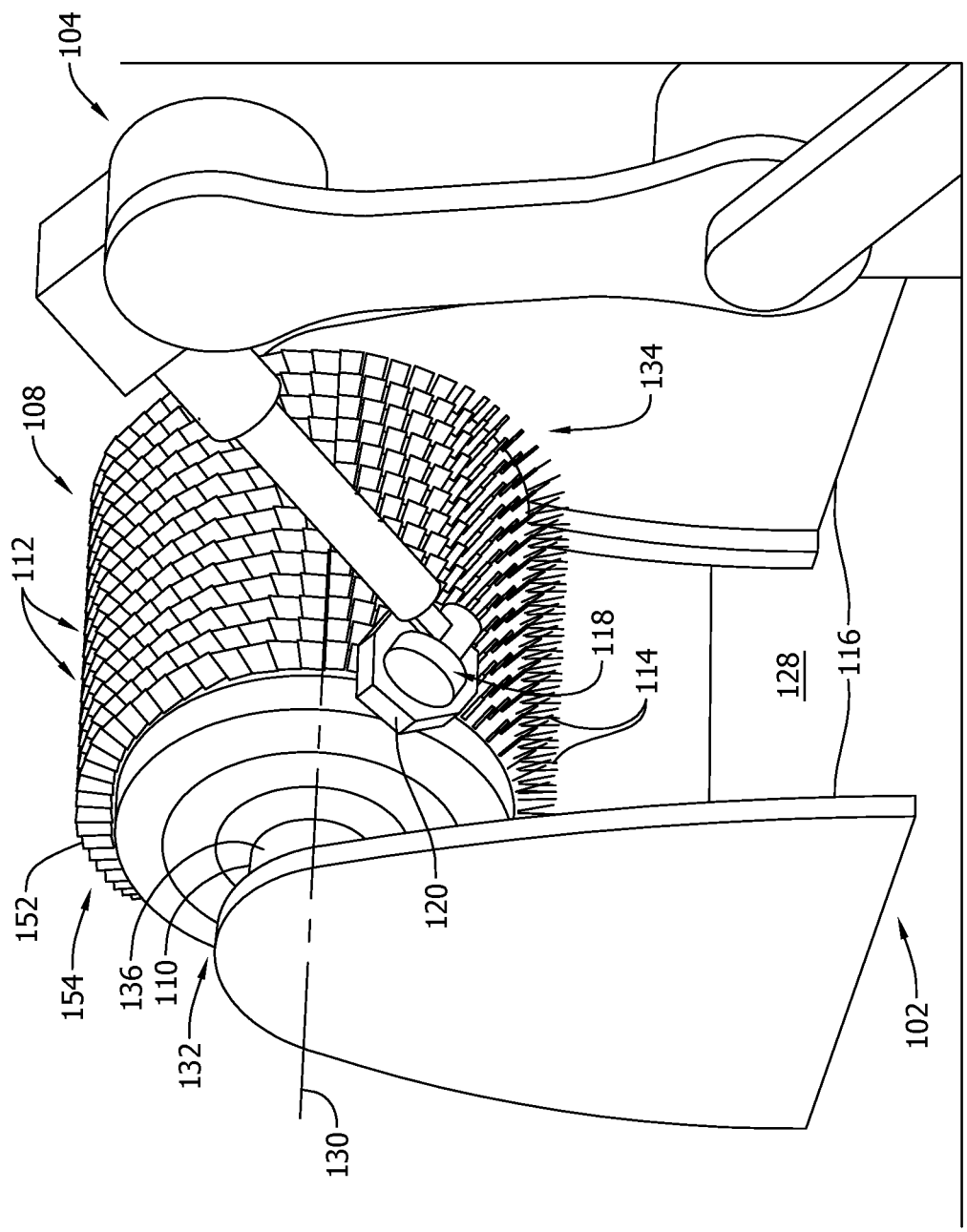
FIG. 2 is a perspective view of the calibration and maintenance system shown in FIG. 1.

FIGS. 1 and 2 illustrate an exemplary calibration and maintenance system 100. In the exemplary embodiment, system 100 includes a rotor mount 102, a robotic device 104, and a computing device 106. Rotor mount 102 is designed to receive and hold a turbine rotor 108 that has been disassembled and removed from an associated turbine engine (not shown) for service, for example. Turbine rotor 108 includes a shaft 110 and a plurality of stages 112 spaced along along shaft 110, wherein each stage 112 includes a plurality of blades 114 that extend radially outward from shaft 110. As shown in FIG. 2, rotor mount 102 includes a pair of ground-based support members 116 spaced apart from each other to enable turbine rotor 108 to be coupled therebetween. For example, support members 116 may be coupled to shaft 110 of turbine rotor 108 in such a manner that enables turbine rotor 108 to be rotatable on rotor mount 102.

Robotic device 104 is any automated robotic system or device that enables system 100 to function as described herein. As shown in FIG. 2, robotic device 104 is a 7-axis robot having an end effector 118 removably coupled thereto. Example end effectors include, but are not limited to, a visual inspection device 120 and a maintenance tool 122. In one embodiment, visual inspection device 120 is a two-dimensional camera and laser visioning system, a laser profiler, a three-dimensional structures light scanner, or a stereo camera system. Maintenance tool 122 is configured to perform at least one of a cleaning operation, a blending operation (i.e., cleaning, polishing, and/or mechanically working a rotor blade to modify the geometry thereof), a non-destructive inspection operation, and/or a repair operation on turbine rotor 108.

Computing device 106 is communicatively coupled to rotor mount 102 and to robotic device 104. Computing device includes a memory 124 (i.e., a non-transitory computer-readable medium) and a processor 126 coupled to memory 124 for executing programmed instructions. Processor 126 may include one or more processing units (e.g., in a multi-core configuration) and/or include a cryptographic accelerator (not shown). Computing device 106 is programmable to perform one or more operations described herein by programming memory 124 and/or processor 126. For example, processor 126 may be programmed by encoding an operation as executable instructions and providing the executable instructions in memory 124.

Processor 126 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 126, cause processor 126 to perform at least a portion of the functions described herein. The above examples are exemplary only, and thus are not intended to limit in any way the definition and/or meaning of the term processor.

Memory 124 is one or more devices that enable information such as executable instructions and/or other data to be stored and retrieved. Memory 124 may include one or more computer-readable media, such as, without limitation, dynamic random access memory (DRAM), synchronous dynamic random access memory (SDRAM), static random access memory (SRAM), a solid state disk, and/or a hard disk. Memory 124 may be configured to store, without limitation, executable instructions, operating systems, applications, resources, installation scripts and/or any other type of data suitable for use with the methods and systems described herein.

Instructions for operating systems and applications are located in a functional form on non-transitory memory 124 for execution by processor 126 to perform one or more of the processes described herein. These instructions in the different implementations may be embodied on different physical or tangible computer-readable media, such as memory 124 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from computing device 106 to permit access and/or execution by processor 126. In an alternative implementation, the computer-readable media is not removable.

As shown in FIG. 2, rotor mount 102 is in a fixed position on a ground surface 128 within a maintenance facility (not shown). Robotic device 104 has a limited range of motion and reach, and is selectively movable relative to rotor mount 102 to perform an evaluation of turbine rotor 108. For example, robotic device 104 may be movable, such as via a wheeled platform or a track system (both not shown), substantially parallel with a rotor axis 130 of turbine rotor 108 to facilitate evaluating turbine rotor 108 from a first end 132 to a second end 134 of shaft 110. Moreover, such movement of device 104 enables an evaluation of each stage 112 of turbine rotor 108 positioned therebetween, as will be explained in more detail below. Robotic device 104 may also move end effector 118 to be positioned at different circumferential locations relative to turbine rotor 108 throughout the evaluation and inspection process.

In operation, system 100 evaluates turbine rotor 108 with visual inspection device 120 to facilitate generating a three-dimensional coordinate system. Moreover, as the 3D coordinate system is generated, system 100 is also calibrated for performance of a subsequent maintenance operation on turbine rotor 108 with robotic device 104. To calibrate robotic device 104, robotic device 104 first evaluates turbine rotor 108 to determine a centerline thereof. For example, computing device 106 directs robotic device 104 to evaluate, with visual inspection device 120, turbine rotor 108 at different circumferential locations thereof to obtain rotor axis data. In one embodiment, an outer surface 136 of shaft 110 is evaluated to obtain the rotor axis data, although any other circumferential surface of turbine rotor 108 may be evaluated to obtain the rotor axis data.

Figure 3:
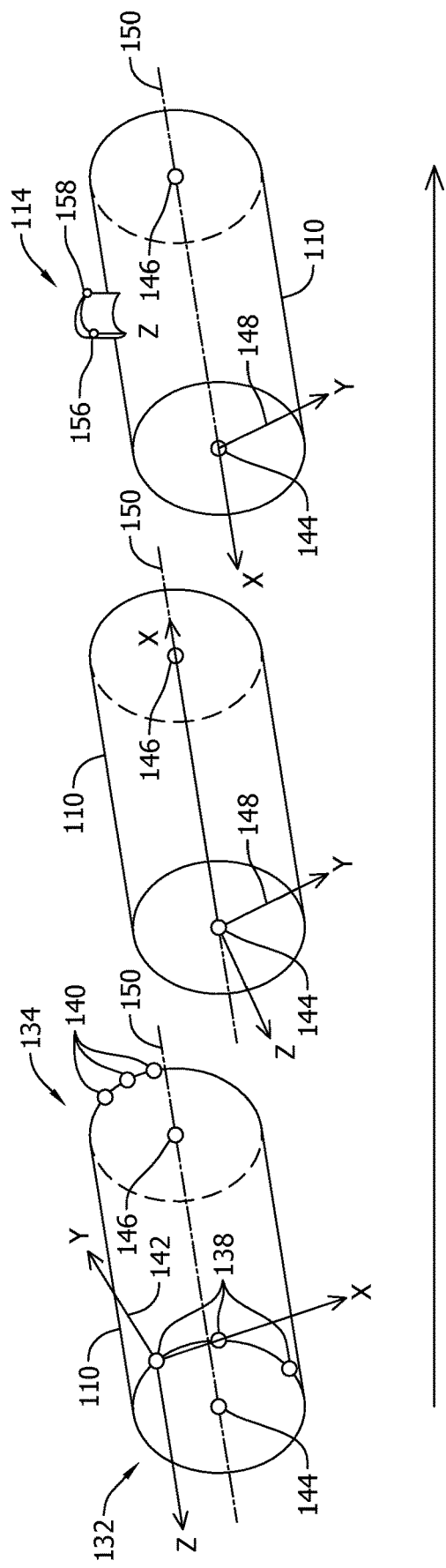
FIG. 3 is an exemplary coordinate system that may be generated by the system shown in FIG. 2.

As shown in FIG. 3, at least three rotor coordinate points 138 (i.e., rotor axis data) are obtained at first end 132 of shaft 110, and at least three rotor coordinate points 140 (i.e., rotor axis data) are obtained at second end 134 of shaft 110. A first user frame 142 is then defined at one of coordinate points 138. First user frame 142 is used to define a plane within the coordinate system, and a first center point 144 is defined on the plane. First center point 144 of shaft 110 is at first end 132, and is determined based on rotor coordinate points 138. A second center point 146 of shaft 110 at second end 134 is determined based on rotor coordinate points 140. Center points 144 and 146 are saved in coordinate system 100, and a second user frame 148 is created based on the determined center points 144 and 146 to determine a centerline 150 of turbine rotor 108. For example, at least one axis of second user frame 148 (e.g., the X-axis) is defined as a centerline 150 of turbine rotor 108, which is typically the axis of gas flow in a turbine. Optionally, second user frame 148 is rotated about its Y-axis. Second user frame 148 is then fixed relative to, and rotates with, shaft 110 of turbine rotor 108 as shaft 110 is rotated on rotor mount 102 (shown in FIG. 2). Additional evaluation of turbine rotor 108 facilitates populating coordinate system 100 relative to second user frame 148 and centerline 150.

For example, and referring again to FIG. 2, computing device 106 directs robotic device 104 to evaluate each blade 114 on each stage 112 of turbine rotor 108 to obtain blade position data relative to centerline 150 (shown in FIG. 3). In one embodiment, computing device 106 directs robotic device 104 to evaluate a first blade 152 of a first stage 154 of turbine rotor 108, and to then evaluate successive blades 114 of first stage 154 from first blade 114 by moving visual inspection device 120 relative to turbine rotor 108. First stage 154 may be evaluated until the range of motion of robotic device 104 is reached. Robotic device 104 may then evaluate blades 114 of successively axially adjacent stages 112 on turbine rotor 108 by moving robotic device 104 relative to rotor axis 130. In one embodiment, rotor mount 102 holds turbine rotor 108 in a first rotational orientation relative to robotic device 104 as robotic device 104 evaluates each stage 112. In such an embodiment, robotic device 104 may move visual inspection device 120 in a serpentine pattern relative to turbine rotor 108 across a respective stage 112, to a successively adjacent stage 112, across the successively adjacent stage 112, and so on. Rotor mount 102 may then rotate turbine rotor 108 to a second rotational orientation relative to robotic device 104, which enables blades 114 on each stage 112, that were outside the range of motion of robotic device 104 while turbine rotor 108 was in the first rotational orientation, to be evaluated.

In an alternative embodiment, turbine rotor 108 is continuously rotatable on rotor mount 102 as blades 114 of each stage 112 are evaluated by visual inspection device 120. In such an embodiment, each successive blade 114 on first stage 154 is evaluated as turbine rotor 108 is rotated, and then robotic device 104 is selectively moved to evaluate each successive stage 112 relative to rotor axis 130.

In the exemplary embodiment, computing device 106 controls the motion of end effector 118 relative to turbine rotor 108 based on a number of blades 114 in each stage 112. For example, in one embodiment, the number of blades 114 in each stage 112 is a known quantity that is stored in memory 124 (shown in FIG. 1). Computing device 106 may then determine a predetermined radial angle between each blade 114 in a respective stage 112. For example, if a respective stage 112 contains 60 blades, the predetermined radial angle between each blade 114 is approximately 3 degrees. In some embodiments, end effector 118 is moved from blade-to-blade by computing device 106 based at least partially on feedback received from visual inspection device 120. For example, visual inspection device 120 may evaluate first blade 152 and then each successive blade 114 needs to be "found" by visual inspection device 120 for a subsequent evaluation to be performed. Moving end effector 118 from blade-to-blade based on the predetermined radial angle across a respective stage 112 of turbine rotor 108 facilitates evaluation of turbine rotor 108 in an efficient and time-reducing manner.

As noted above, computing device 106 directs robotic device 104 to evaluate each blade 114 on each stage 112 of turbine rotor 108 to obtain blade position data. In the exemplary embodiment, as shown in FIG. 3, robotic device 104 evaluates each blade to obtain a leading edge coordinate point 156 and a trailing edge coordinate point 158 of each blade 114, thereby determining the position of each blade 114 relative to centerline 150. Coordinate points 156 and 158 of each blade 114 are populated in coordinate system 100, which may then be used to control movement of end effector 118 in performance of a maintenance operation on turbine rotor 108, as described above.

In one embodiment, a visual inspection of each blade 114 is performed with visual inspection device 120 as the blade position data is obtained. The visual inspection is performed to identify blades 114 having potential defects thereon. In addition, a unique identifier (not shown) may be assigned to each blade 114 identified in coordinate system 100. Accordingly, the unique identifier of blades 114 identified as having a potential defect thereon is stored in memory 124, and may be used to coordinate the performance of maintenance operations on turbine rotor 108 in the future.

Figure 4:
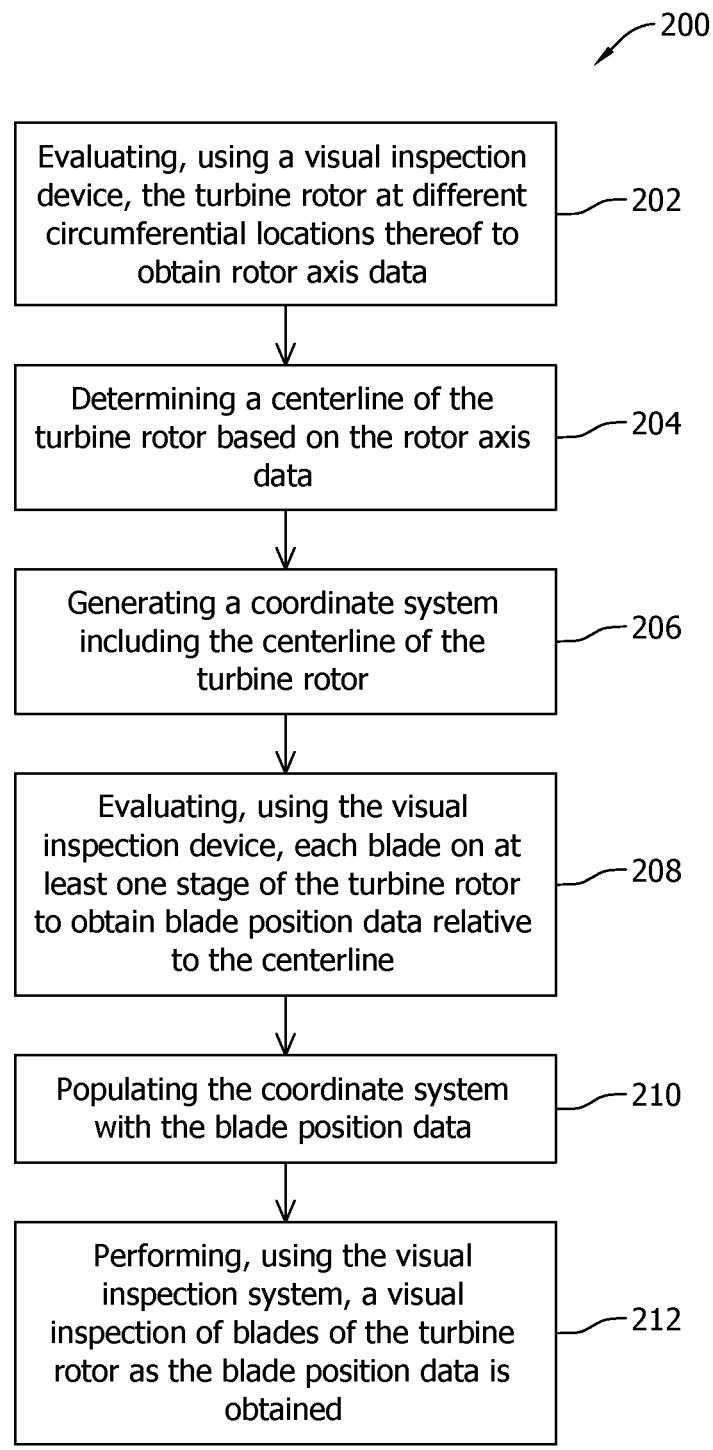
FIG. 4 is a flow diagram illustrating an exemplary method of calibrating a robotic device for use in performing maintenance on a turbine rotor.

FIG. 4 is a flow diagram illustrating an exemplary method 200 of calibrating a robotic device for use in performing maintenance on a turbine rotor. Method 200 includes evaluating 202 the turbine rotor at different circumferential locations thereof to obtain rotor axis data, determining 204 a centerline of the turbine rotor based on the rotor axis data, generating 206 a coordinate system including the centerline of the turbine rotor, evaluating 208 each blade on at least one stage of the turbine rotor to obtain blade position data relative to the centerline, populating 210 the coordinate system with the blade position data, and performing 212 a visual inspection of blades of the turbine rotor as the blade position data is obtained.

The embodiments described herein relate to systems and methods of performing maintenance on a turbine rotor in a fast, efficient, and repeatable manner. By calibrating the robotic device with the visual inspection device, manual inspection of the turbine rotor is no longer required, thereby reducing the potential for human error and tool damage. Accordingly, the systems and methods described herein facilitate evaluating a turbine rotor in a fast and efficient manner, thereby enabling automated maintenance operations to be performed and reducing down time of an associated gas turbine assembly.

The above description is meant to be exemplary only, and one skilled in the art will recognize that changes may be made to the embodiments described without departing from the scope of the invention disclosed. For example, the process steps described herein may be modified in duration, temperature, or time between cycles, for example. Still other modifications, which fall within the scope of the present invention, will be apparent to those skilled in the art, in light of a review of this disclosure, and such modifications are intended to fall within the appended claims.

Exemplary embodiments of an actively brazed joint and methods of processing thereof are described above in detail. The methods are not limited to the specific embodiments described herein, but rather, steps of the methods may be utilized independently and separately from other steps described herein. For example, the methods described herein are not limited to practice with only joints to be used in the hot gas path of a gas turbine engine as described herein. Rather, the exemplary embodiment can be implemented and utilized in connection with many other applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

While the invention has been described in terms of various specific embodiments, those skilled in the art will recognize that the invention can be practiced with modification within the spirit and scope of the claims.

What is claimed is:

1. A system for use in performing maintenance on a turbine rotor, the system comprising:
    a rotor mount configured to receive the turbine rotor;
    a robotic device;
    a visual inspection device coupled to the robotic device; and
    a computing device configured to:
        direct the robotic device to evaluate, with the visual inspection device, the turbine rotor at different circumferential locations thereof to obtain rotor axis data;
        determine a centerline of the turbine rotor based on the rotor axis data;
        generate a coordinate system including the centerline of the turbine rotor;
        direct the robotic device to evaluate, with the visual inspection device, a plurality of blades on at least one stage of the turbine rotor to obtain blade position data relative to the centerline; and
        populate the coordinate system with the blade position data.

2. The system in accordance with claim 1 further comprising a maintenance tool coupled to the robotic device, wherein the maintenance tool is configured to perform a maintenance operation on the turbine rotor based on the coordinate system.

3. The system in accordance with claim 2, wherein the maintenance tool is configured to perform at least one of a cleaning operation, a blending operation, a non-destructive inspection operation, or a repair operation.

4. The system in accordance with claim 1, wherein the rotor mount is rotatable for rotating the turbine rotor relative to the robotic device.

5. The system in accordance with claim 1, wherein the visual inspection device is an end effector of the robotic device, wherein the computing device directs the robotic device to evaluate the turbine rotor by moving the visual inspection device relative to the turbine rotor.

6. The system in accordance with claim 1, wherein the computing device is further configured to direct the robotic device to perform, with the visual inspection device, a visual inspection of blades of the turbine rotor as the blade position data is obtained.

7. A method of calibrating a robotic device for use in performing maintenance on a turbine rotor, the method comprising:
    evaluating, using a visual inspection device, the turbine rotor at different circumferential locations thereof to obtain rotor axis data;
    determining a centerline of the turbine rotor based on the rotor axis data;
    generating a coordinate system including the centerline of the turbine rotor;
    evaluating, using the visual inspection device, a plurality of blades on at least one stage of the turbine rotor to obtain blade position data relative to the centerline; and
    populating the coordinate system with the blade position data.

8. The method in accordance with claim 7, wherein evaluating the turbine rotor comprises evaluating a surface of a shaft of the turbine rotor to obtain the rotor axis data.

9. The method in accordance with claim 8, wherein evaluating a surface of the shaft comprises obtaining a first set of at least three rotor coordinate points at a first end of the shaft, and obtaining a second set of at least three rotor coordinate points at an opposing second end of the shaft.

10. The method in accordance with claim 7, wherein the visual inspection device is an end effector of the robotic device, wherein evaluating the turbine rotor comprises moving the visual inspection device relative to the turbine rotor.

11. The method in accordance with claim 10, wherein evaluating blade positions comprises evaluating a first blade of the at least one stage and then evaluating successive blades of the at least one stage from the first blade.

12. The method in accordance with claim 11, wherein successively evaluating each blade comprises rotating the turbine rotor relative to the robotic device.

13. The method in accordance with claim 11, wherein successively evaluating each blade comprises:
    determining a predetermined radial angle between each blade in the at least one stage based on a number of blades in the at least one stage; and
    controlling movement of the visual inspection device relative to the turbine rotor based on the predetermined radial angle.

14. The method in accordance with claim 7, wherein evaluating blade positions comprises obtaining a leading edge coordinate point and a trailing edge coordinate point of each blade in the at least one stage to define the blade position data.

15. The method in accordance with claim 7 further comprising performing a maintenance operation on the turbine rotor with the robotic device based on the coordinate system.

16. A method of calibrating a robotic device for use in performing maintenance on a turbine rotor, the method comprising:
    evaluating, using a visual inspection device on the robotic device, the turbine rotor at different circumferential locations thereof to obtain rotor axis data;
    determining a centerline of the turbine rotor based on the rotor axis data;
    evaluating, using the visual inspection device, a plurality of blades on at least one stage of the turbine rotor to obtain blade position data relative to the centerline; and
    performing, using the visual inspection device, a visual inspection of blades of the turbine rotor as the blade position data is obtained.

17. The method in accordance with claim 16 further comprising:
    generating a coordinate system including the centerline of the turbine rotor; and
    populating the coordinate system with the blade position data.

18. The method in accordance with claim 17 further comprising:
    assigning a unique identifier to each blade defined in the coordinate system; and
    coordinating a maintenance operation to be performed on the turbine rotor based on the unique identifier.

19. The method in accordance with claim 16, wherein performing a visual inspection comprises:
  identifying blades of the turbine rotor having a potential defect for further inspection; and
  performing a maintenance operation on the blades having the potential defect.

20. The method in accordance with claim 19, wherein performing a maintenance operation comprises performing perform at least one of a cleaning operation, a blending operation, a non-destructive inspection operation, or a repair operation.

\* \* \* \* \*